E. ABARCA.
APPARATUS FOR GROOVING SUGAR CANE CRUSHING ROLLERS.
APPLICATION FILED NOV. 2, 1917.
1,270,681.
Patented June 25, 1918.
2 SHEETS—SHEET 2.
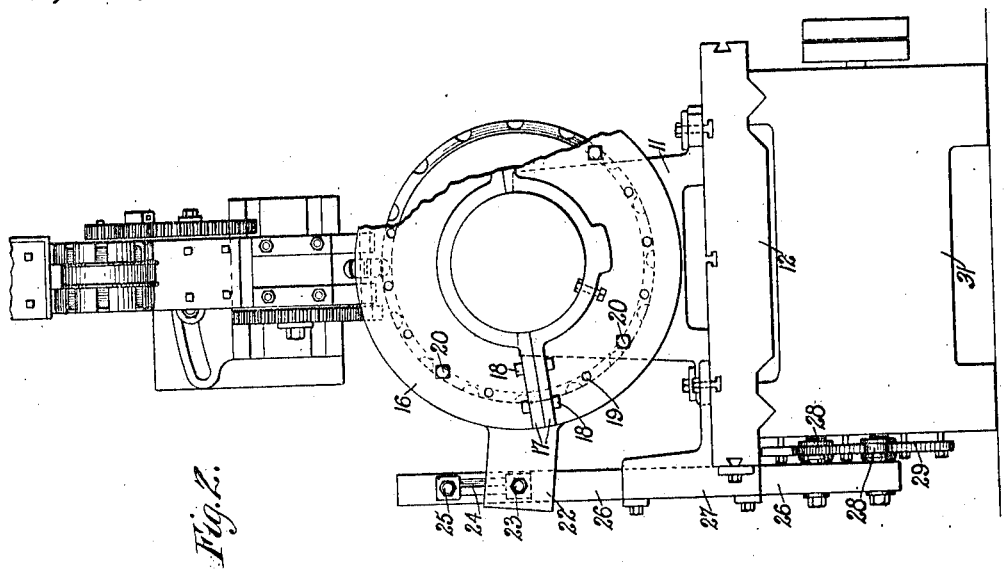
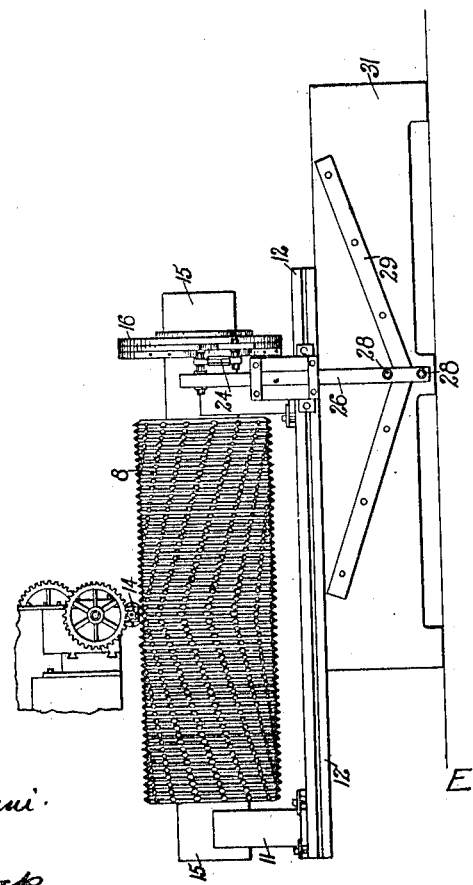
WITNESSES
Frank L. Faggiani
INVENTOR
Enrique Abarca
BY
ATTORNEYS

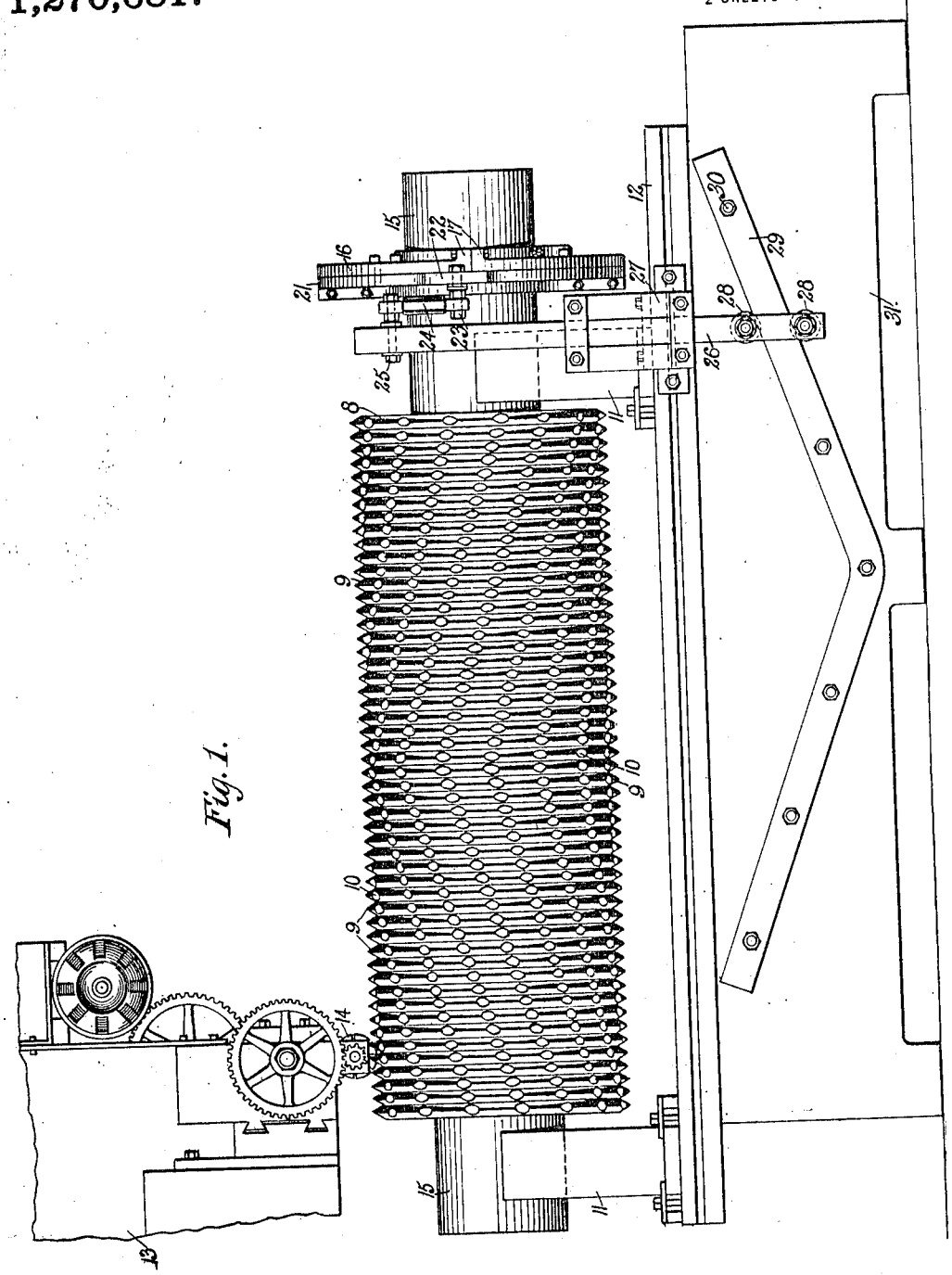

UNITED STATES PATENT OFFICE.

ENRIQUE ABARCA, OF SAN JUAN, PORTO RICO.

APPARATUS FOR GROOVING SUGAR-CANE-CRUSHING ROLLERS.

1,270,681.  Specification of Letters Patent.  Patented June 25, 1918.

Application filed November 2, 1917. Serial No. 199,961.

*To all whom it may concern:*

Be it known that I, ENRIQUE ABARCA, a citizen of Porto Rico, and a resident of San Juan, Porto Rico, have invented a new and Improved Apparatus for Grooving Sugar-Cane-Crushing Rollers, of which the following is a full, clear, and exact description.

Among the principal objects which the present invention has in view are: to facilitate the operation of cutting inclined grooves in a roller for macerating sugar cane; to automatically control the circular feed of said roller during the cutting of said grooves therein; to provide means for accurately spacing said grooves to be cut; and to reduce the cost of cutting said grooves.

Drawings.

Figure 1 is a side elevation showing a crushing roller having inclined grooves cut therein, and the apparatus employed for cutting the same;

Fig. 2 is an end elevation of the same, part of the gage plate being cut away to show a portion of the end of the roller;

Fig. 3 is a side elevation on a reduced scale showing the roller as being operated upon and the rocking mechanism therefor as in one of the limits of its throw.

Description.

As seen in the drawings, a roller 8 used for crushing or macerating sugar cane, has a series of ridges 9 of greater or lesser projection formed thereon. These ridges have been cross-cut by a miller or other suitable cutting tool to form the nicks 10, as seen best in Fig. 1 of the drawings.

Crushing rollers known as the Fuller type, have been constructed heretofore in this manner, using any suitable form of cutting apparatus. Generally, the pitch of the grooves formed by the successive nicks 10 have been marked on the rollers to guide the hand tools or the hand-setting of the machine tools.

When employed the herein-disclosed apparatus, the roller is mounted in open bearings formed on standards 11. The standards 11 are bolted to the bed 12 of a planer. The planer has a head 13, which is suitably equipped with a milling cutter 14 and driving mechanism therefor. The bed 12 and parts mounted thereon are fed to the cutter 14 at any suitable and desired rate.

Clamped rigidly on one of the trunnions 15 with which the roller is provided, is a face plate 16. The face plate 16 has bolting flanges 17, which in service are united by fastening bolts 18. The face plate 16 has a series of holes 19 disposed about the said plate in equal divisions thereof. The holes 19 are provided to receive bolts 20, which extend through the plates 16 and 21. The plate 21 is loosely mounted on the trunnions 15 and is concentric with the plate 16.

Set out from the edge of the plate 21, is an extension bracket 22. The bracket 22 has a bolt 23, which forms a pivot for a link 24. The link 24 is pivotally attached by means of a bolt 25 to the sliding bar 26. The bar 26 is employed to rock the roller 8 on its bearings in the standard 11. To this end, it is mounted in bearings in a bracket 27, to move in a path parallel with the planes of the plates 16 and 21.

Adjacent the lower end of the bar 26, are rollers 28. The rollers 28 track at the opposite edges of a bent track bar 29. The bar 29 is secured by bolts 30 to the side of the pedestal 31 of the planer on which the bed 12 is mounted.

The bar 29 is bent to the angle formed by the platted path of the grooves formed by the nicks 10. The bracket 27 is rigidly mounted on the bed 12 and travels with the bed around the same carrying the roller 8 under the cutter 14.

As an incident to the movement thus imparted to the roller 8, the bar 26 is shifted vertically carrying the bolt 25 therewith. The bracket 22 is moved in correspondence with the bar 26 and the plate 21 of which said bracket is a part, is rotated on its center. As the plate 21 is operatively attached to the plate 16, the plate 16 and the roller 8 to which it is rigidly connected, are likewise rotated on their centers. It is obvious that the rotation thus effected in the roller corresponds exactly to the shape of the bar 29. In this manner, the shape of the grooves having the nicks 10, is regulated.

After each groove of the nicks 10 has been cut, the bolts 20 are removed to release the plates 16 and 21. The bed 12 and the roller carried thereon is returned to the initial cutting position where the bar 26 is raised or brought to its initial operating position. The roller 8 and plate 16 connected therewith are then rotated until the next set of holes 19 register with the bolt-holes for the bolts 20. The bolts 20 are then readjusted to connect the two plates rigidly prior to inaugurating the operation of the cutter 14 and the movement of the bed 12. By this means accuracy in the spacing of the grooves formed by the nicks 10 is secured.

Claim.

An apparatus as characterized comprising a permanently positioned cutting tool; a support for a crushing roller, said support embodying standards having bearings for said roller; means for moving said support and said roller carried thereon lengthwise of said roller under said cutting tool; and means for mechanically rotating said roller coincident to the movement of said support under said cutting tool, said means embodying a pattern member substantially disposed in a plane parallel with the axis of said roller, and a crank-like member rigidly engaging said roller and operatively engaging said pattern member to be oscillated thereby during the longitudinal movement of said support and said roller.

ENRIQUE ABARCA.

Copies of this patent may be obtained for five cents each, by addressing the "Commissioner of Patents, Washington, D. C."